April 5, 1927.
P. P. CHAPIN ET AL
AUTOMATIC EGG BOILER
Filed June 28, 1926
1,623,093
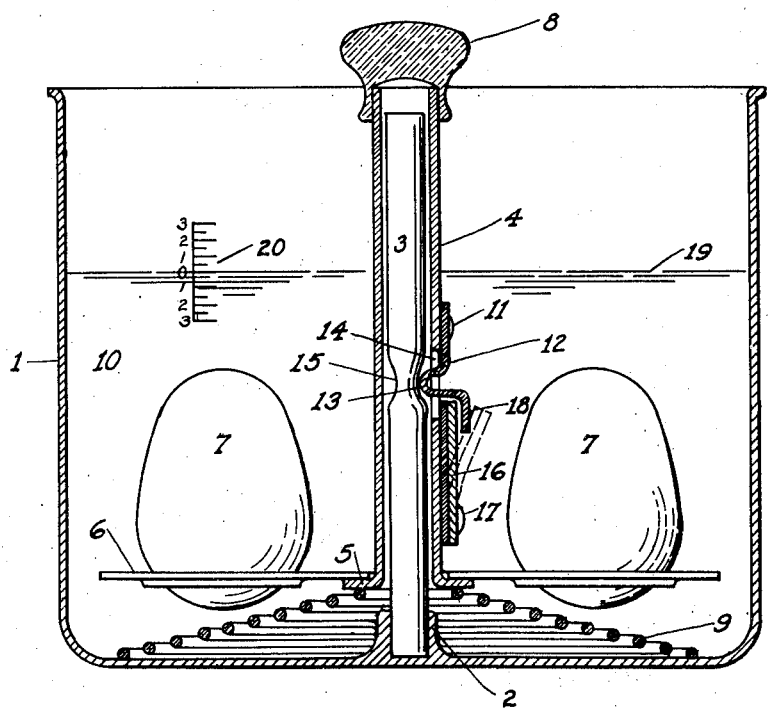

Patented Apr. 5, 1927.

1,623,093

UNITED STATES PATENT OFFICE.

PHILIP P. CHAPIN AND WILLIAM J. KUPEC, OF NEW YORK, N. Y., ASSIGNORS OF ONE-THIRD TO DOMINICK CASTAGNARO, OF NEW YORK, N. Y.

AUTOMATIC EGG BOILER.

Application filed June 28, 1926. Serial No. 119,096.

This invention relates to egg boilers that operate automatically to boil the eggs to a requisite cooked state. Its principal object is to provide a device for this purpose which will be simple, inexpensive, efficient, and particularly adaptable for home uses, as distinguished from clock-operated or expensive automatic egg boilers that are more adaptable for restaurants and commercial uses.

In carrying out this invention, advantage is taken of the natural principle that when heating a given quantity of water in a vessel over a constant source of heat, such as a gas burner or an electric plate, it will require a definite length of time to bring up such body of water from a definite normal temperature to its boiling temperature of 212°. It has also been found that when placing an egg in cold water and then heating the water with a gas burner, which is the proper way to cook eggs to soft-boiled state, the cooking process of the egg will commence when the water reaches a certain critical temperature, and that the egg can be then brought up to proper soft-boiled state upon the water reaching a boiling temperature; provided however a definite period of time has been permitted to elapse between the said critical temperature of the water and its boiling temperature, so as to properly complete the cooking process. Such definite period of time can be supplied, in conjunction with any particular intensity of heat-source, by means of the provision of a predetermined volume of water at the commencement of the cooking, which volume is commensurate with such heat source. In carrying out the invention with the utilization of the aforesaid principles, a vessel is provided to hold the said predetermined volume of water, and an egg-carrying frame is mounted to slide upwardly and downwardly in said vessel. A spring normally tends to lift said frame out of the water, and a detent operates to maintain the frame submerged contrary to the action of said spring. A bimetallic thermostatic bar, which is submerged in said vessel, operates to release said detent and permit said spring to lift said frame out of the water when it reaches the boiling point.

The specific apparatus embodying the invention is hereinafter fully shown and described, and other objects and advantages of the invention will hereinafter appear.

The accompanying drawing shows a longitudinal cross-sectional elevation of the apparatus.

A vessel 1 is adapted to hold the required predetermined volume of water, and it is provided with a central lug 2 at the bottom thereof, to which lug is secured a guiding-post 3. A tube 4 is telescopically slidable over the post 3 and is provided with a flange 5 to which is secured a carrying frame 6 adapted to hold one or more eggs 7. To the upper extremity of the tube 4 is fixed a knob 8 for the convenient manipulation of said tube and frame. Between the frame 6 and bottom of the vessel, and surrounding the lug 2 and post 3, is located a spiral spring 9, which constantly bears against the flange 5 and normally tends to slide the tube 4 upwardly and to lift the frame 6 out of the water 10. To the tube 4 is secured at 11 a spring-detent 12 having a yoked portion 13 which normally enters the tube through an opening 14 provided in its wall, and when the tube is in the depressed position shown the detent-portion 13 engages an annularly grooved portion 15 of the post 3 and thereby locks the tube and frame 6 in the depressed state, contrary to the pressure of spring 9. A thermostatic bimetallic bar 16 is secured at 17 to the tube 4, and when the bar is in the submerged state shown it is disposed against the wall of said tube. As the water is being heated the bar 16 gradually flexes away from that position, in the manner shown by the dash and dot lines, and as it flexes it engages a projection 18 of the spring-detent 12 and thereby ultimately withdraws the detent from the groove 15, whereupon the tube 4 becomes released and the spring 9 operates to elevate the frame 6 with the eggs out of the water and above its level 19, which elevating action is accomplished by the thermostat 16 when the water reaches the boiling temperature of 212°.

When using the apparatus it requires merely the placing of the eggs in the frame 6 and submerging the frame with the eggs by pressing downwardly upon the knob 8, whereupon the detent 12 will lock the frame in the depressed state. The vessel may be then placed over the usual gas burner and the water heated in the usual manner, and when the boiling point is reached the thermostat will automatically release the detent 12 and the spring will lift the eggs out of the water in properly cooked soft-boiled condition.

Before using the apparatus it is essential that the water in the vessel 1 should be of the predetermined required volume for proper operation, and to aid in thus determining the proper water level in the vessel a gauge 20 is provided upon the inner side of the wall of the vessel, which gauge preferably bears a zero mark for the proper water level, as shown, with a plurality of graduations, above and below the zero mark, numbered 1, 2, 3, etc. In practice, the zero mark of the gauge is located at a point which will mark a volume of water which would be coincident with the proper cooking of the eggs to soft-boiled condition over an average household gas burner. Should it subsequently be found by the user that his available gas burner cooks inefficiently, because its heat capacity varies from the average to which the zero mark has been located, or because the user desires a higher or lower soft-boiled condition than the one to which the zero mark has been adjusted, he may then utilize a somewhat smaller or larger volume of water to bring the operation of the apparatus up to his requirements, and the user will be guided in this readjustment by the utilization of the graduated markings upon the gauge 20.

Variations may be resorted to within the scope of the invention.

Having thus described our invention, we claim:—

1. An egg boiler having the combination of a vessel for water, an egg carrier in said vessel, a spring to lift said carrier out of the water, spring means to maintain said carrier submerged contrary to the pressure of said spring, and a thermostatic bar adapted to flex and actuate said means to permit said spring to move said carrier out of the water.

2. An egg boiler having the combination of a vessel for water, an egg carrier in said vessel, means to lift said carrier out of the water, means to maintain said carrier submerged, and a thermostatic bar adapted to flex and actuate said maintaining means to permit said lifting means to move said carrier out of the water.

3. An egg boiler having the combination of a vessel for water, an egg carrier in said vessel, a spring to lift said carrier out of the water, spring means to maintain said carrier submerged contrary to the pressure of said spring, and a submerged thermostatic bar adapted to flex and actuate said means to permit said spring to move said carrier out of the water.

4. An egg boiler having a vessel adapted to hold a water-volume having relation to the time required to soft-boil eggs from a constant heat source between a normal temperature and water boiling temperature, an egg carrier in said vessel, a spring to lift said carrier out of the water, spring means to maintain said carrier submerged contrary to the pressure of said spring, and a thermostatic bar adapted to flex and actuate said means to permit said spring to move said carrier out of the water.

5. An egg boiler having a vessel adapted to hold a water-volume having relation to the time required to soft-boil eggs from a constant heat source between a normal temperature and water boiling temperature, said vessel having graduated indication means to adjust the water-volume to the constant heat source, an egg carrier in said vessel, means to lift said carrier out of the water, means to maintain said carrier submerged, and a thermostatic bar adapted to cause said maintaining means to permit said lifting means to move said carrier out of the water.

Signed at the city of New York, in the county of New York, and State of New York, this 26th day of June, A. D. 1926.

PHILIP P. CHAPIN.
WILLIAM J. KUPEC.